United States Patent
Yeh et al.

(10) Patent No.: US 12,398,963 B2
(45) Date of Patent: Aug. 26, 2025

(54) LARGE-SIZE LIQUID-COOLING COOLER FOR ELECTRIC VEHICLE

(71) Applicant: AMULAIRE THERMAL TECHNOLOGY, INC., New Taipei (TW)

(72) Inventors: Tze-Yang Yeh, New Taipei (TW); Shih-Ming Chan, New Taipei (TW)

(73) Assignee: AMULAIRE THERMAL TECHNOLOGY, INC., New Taipei (TW)

( * ) Notice: Subject to any disclaimer, the term of this patent is extended or adjusted under 35 U.S.C. 154(b) by 210 days.

(21) Appl. No.: 18/186,200

(22) Filed: Mar. 20, 2023

(65) Prior Publication Data

US 2024/0318927 A1  Sep. 26, 2024

(51) Int. Cl.
| | |
|---|---|
| *F28F 13/18* | (2006.01) |
| *B60R 16/08* | (2006.01) |
| *F28D 9/00* | (2006.01) |
| *F28F 3/12* | (2006.01) |
| *F28F 21/08* | (2006.01) |

(52) U.S. Cl.
CPC ............... *F28F 13/18* (2013.01); *B60R 16/08* (2013.01); *F28D 9/0037* (2013.01); *F28F 3/12* (2013.01); *F28F 21/084* (2013.01)

(58) Field of Classification Search
CPC .. F28F 13/18; F28F 3/12; B60R 16/08; F28D 9/0037
USPC .................................. 165/133, 104.33
See application file for complete search history.

(56) References Cited

U.S. PATENT DOCUMENTS

| | | | |
|---|---|---|---|
| 2013/0328184 A1* | 12/2013 | Iwayama | H01L 23/3731 428/471 |
| 2018/0286781 A1 | 10/2018 | Yoshihara et al. | |
| 2019/0341335 A1* | 11/2019 | Koyama | F28D 1/03 |
| 2022/0377940 A1* | 11/2022 | Yang | G06F 1/20 |

FOREIGN PATENT DOCUMENTS

| | | |
|---|---|---|
| CN | 108701688 A | 10/2018 |
| TW | M615649 U | 8/2021 |

* cited by examiner

*Primary Examiner* — Joel M Attey
(74) *Attorney, Agent, or Firm* — Li & Cai Intellectual Property Office

(57) ABSTRACT

A large-size liquid-cooling cooler for an electric vehicle includes a liquid-cooling cooler body and at least one bonding interface layer. The liquid-cooling cooler body has a projection area greater than 150 cm$^2$, and a cooling flow channel is formed inside the liquid-cooling cooler body for allowing cooling fluid to flow through the cooling flow channel. The at least one bonding interface layer is a cold spray coating layer formed on the liquid-cooling cooler body by cold spraying and corresponds in position to the cooling flow channel. A projection area of the at least one bonding interface layer is greater than 30 cm$^2$, a thickness of the at least one bonding interface layer is between 0.03 mm and 0.25 mm, and a ten-point average roughness (Rz) of a surface of the at least one bonding interface layer is from 30 μm to 90 μm.

8 Claims, 3 Drawing Sheets

LARGE-SIZE LIQUID-COOLING COOLER FOR ELECTRIC VEHICLE

FIELD OF THE DISCLOSURE

The present disclosure relates to a liquid-cooling cooler, and more particularly to a large-size liquid-cooling cooler for an electric vehicle.

BACKGROUND OF THE DISCLOSURE

Power modules of an existing electric vehicle operate at high power. Without proper heat dissipation measures, the temperature of the power modules of the electric vehicle may exceed an allowable temperature, resulting in deterioration of performance and damage.

Therefore, the power modules of the existing electric vehicles are disposed on a liquid-cooling cooler through various bonding processes to meet heat dissipation requirements. However, conventional liquid-cooling coolers of the existing electric vehicle are unable to meet the higher demands for heat dissipation.

SUMMARY OF THE DISCLOSURE

In response to the above-referenced technical inadequacy, the present disclosure provides a large-size liquid-cooling cooler for an electric vehicle.

In one aspect, the present disclosure provides a large-size liquid-cooling cooler for an electric vehicle configured to be bonded to at least one electric vehicle power module. The large-size liquid-cooling cooler includes a liquid-cooling cooler body and at least one bonding interface layer. The liquid-cooling cooler body has a projection area greater than 150 $cm^2$, and a cooling flow channel is formed inside the liquid-cooling cooler body for allowing cooling fluid to flow through the cooling flow channel. The at least one bonding interface layer is a cold spray coating layer formed on the liquid-cooling cooler body by cold spraying and corresponds in position to the cooling flow channel. A projection area of the at least one bonding interface layer is greater than 30 $cm^2$, a thickness of the at least one bonding interface layer is between 0.03 mm and 0.25 mm, and a ten-point average roughness (Rz) of a surface of the at least one bonding interface layer is from 30 μm to 90 μm.

In certain embodiments, the liquid-cooling cooler body has a first surface and a second surface that are opposite to each other, and the liquid-cooling cooler body includes a first cooler member and a second cooler member. An outer surface of the first cooler member is the first surface, and an outer surface of the second cooler member is the second surface. At least one cavity is formed between the first cooler member and the second cooler member, and the at least one cavity is the cooling flow channel.

In certain embodiments, the first cooler member is a plate, and a plate thickness of the first cooler member is from 0.5 mm to 3 mm.

In certain embodiments, the liquid-cooling cooler body is made of aluminum or aluminum alloy.

In certain embodiments, the cooling flow channel has a bent shape.

In certain embodiments, a flow channel height of the cooling flow channel corresponding in position to the at least one bonding interface layer is from 2 mm to 8 mm.

In certain embodiments, a body thickness of the liquid-cooling cooler body is 1.2 times to 4 times the flow channel height of the cooling flow channel corresponding in position to the at least one bonding interface layer.

In certain embodiments, plurality ones of the bonding interface layers correspond in position to the cooling flow channel, and the bonding interface layers are arranged in pairs and one of the pairs of bonding interface layers corresponds in position to another one of the pairs of bonding interface layers.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
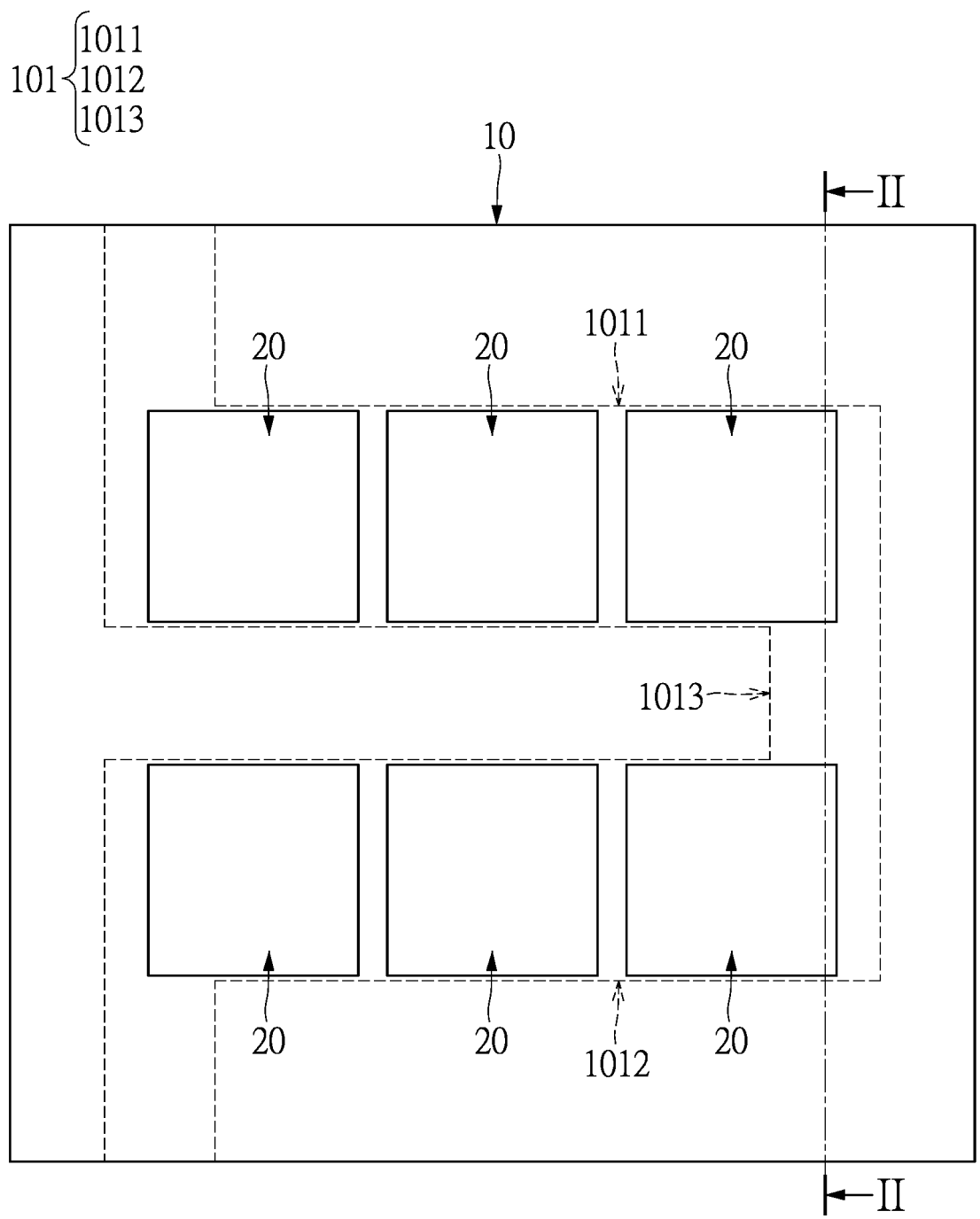
FIG. 1 is a schematic top view of a large-size liquid-cooling cooler for an electric vehicle according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
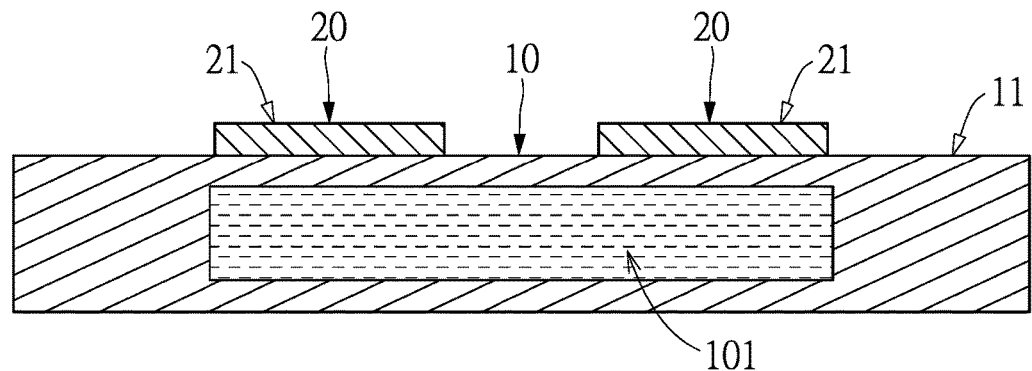
FIG. 2 is a schematic cross-sectional view taken along line II-II of FIG. 1.
Figure 3:
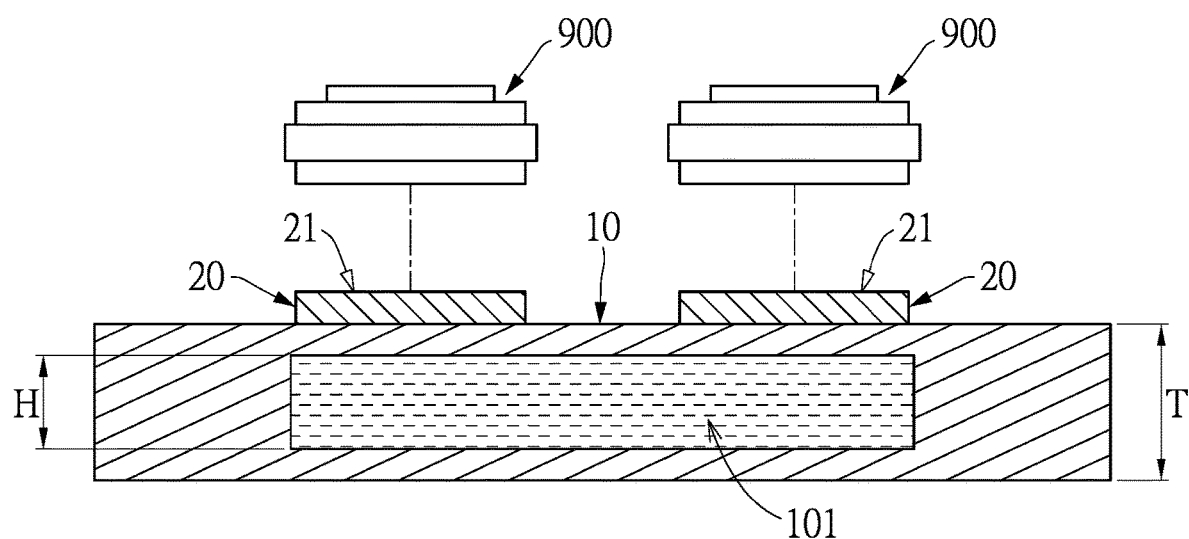
FIG. 3 is schematic view of a use state of the large-size liquid-cooling cooler according to the first embodiment of the present disclosure.

Reference is made to FIG. 1 to FIG. 3, in which a first embodiment of the present disclosure is shown. Embodiments of the present disclosure provide a large-size liquid-cooling cooler for an electric vehicle. The large-size liquid-cooling cooler is configured to be bonded to at least one electric vehicle power module 900. As shown in the figures, the large-size liquid-cooling cooler for an electric vehicle provided by embodiments of the present disclosure includes a liquid-cooling cooler body 10 and at least one bonding interface layer 20.

In this embodiment, the liquid-cooling cooler body 10 can be made of a thermally conductive material such as aluminum or aluminum alloy. Further, the liquid-cooling cooler body 10, as shown in FIG. 1, is a main body of a large-size liquid-cooling cooler, and can have a projection area (a top surface area) of hundreds of square centimeters. Specifically, a projection area (a top surface area) of the liquid-cooling cooler body 10 is greater than 150 cm$^2$, such that sufficient heat-dissipation area can be provided for the power module 900 of an electric vehicle having an extremely high operation temperature.

Furthermore, a cooling flow channel 101 is formed inside the liquid-cooling cooler body 10 for allowing cooling fluid to flow through the cooling flow channel 101. In addition, the at least one bonding interface layer 20 is formed on the liquid-cooling cooler body 10 and corresponds in position to the cooling flow channel 101 formed inside the liquid-cooling cooler body 10, so that heat generated during an operation of the electric vehicle power module 900 can be transmitted to the liquid-cooling cooler body 10 having a large size, and be rapidly removed through the cooling fluid (such as water or ethylene glycol) in the cooling flow channel 101.

In addition, the bonding interface layer 20 of this embodiment is a cold spray coating layer formed on the liquid-cooling cooler body 10 by cold spraying. That is, the bonding interface layer 20 is a particle coating formed by embedding metal material particles into a surface 11 of the liquid-cooling cooler body 10 via high speed impact, so as to improve bonding strength and heat conductivity performance of the liquid-cooling cooler. Furthermore, the metal material particles may be copper, silver, nickel, etc.

Moreover, a thickness of the bonding interface layer 20 is between 0.03 mm and 0.25 mm, and a projection area (a top surface area) of the bonding interface layer 20 is greater than 30 cm$^2$. Therefore, the electric vehicle power module 900 can be properly bonded to the liquid-cooling cooler body 10 via the bonding interface layer 20, and transmit heat generated from operation to the large-sized liquid-cooling cooler body 10.

In addition, a ten-point average roughness (Rz) of a surface 21 of the bonding interface layer 20 is from 30 μm to 90 μm. Therefore, a bonding strength after the surface 21 of the bonding interface layer 20 is bonded to the electric vehicle power module 900 can be improved, and the bonding interface layer 20 can be bonded to the electric vehicle power module 900 by soldering tin or copper.

Furthermore, in this embodiment, the cooling flow channel 101 has a bent shape, and the cooling flow channel 101 is formed in the liquid-cooling cooler body 10 that has a large size, so that the cooling fluid in the cooling flow channel 101 flows through a large area and has a long flow time, thereby improving the effect of heat removal.

Specifically, the cooling flow channel 101 can include a first flow channel 1011 and a second flow channel 1012 that are opposite to each other, and a connection flow channel 1013 that connects between the first flow channel 1011 and the second flow channel 1012. Furthermore, plurality ones of the bonding interface layers 20 can correspond in position to the cooling flow channel 101, and the bonding interface layers 20 are arranged in pairs and one of the pairs of bonding interface layers 20 corresponds in position to another one of the pairs of bonding interface layers 20. In detail, six bonding interface layers 20 can be provided in the present embodiment, and three bonding interface layers 20 correspond in position to the first flow channel 1011, and another three bonding interface layers 20 correspond in position to the second flow channel 1012. In addition, the first flow channel 1011 corresponds to a total projection area of the three bonding interface layers 20, that is, a projection area of the first flow channel 1011 is substantially the same as the total projection area of the three bonding interface layers 20. Moreover, the second flow channel 1012 corresponds to a total projection area of the another three bonding interface layers 20, that is, a projection area of the second flow channel 1012 is substantially the same as the total projection area of the another three bonding interface layers 20. Therefore, a good cooling effect can be provided to the bonding interface layers 20.

In order to improve the cooling effect, a flow channel height H of the cooling flow channel 101 corresponding in position to the bonding interface layer 20 is preferably from 2 mm to 8 mm, and a body thickness T of the liquid-cooling cooler body 10 is preferably 1.2 times to 4 times the aforementioned flow channel height H.

Second Embodiment

Figure 4:
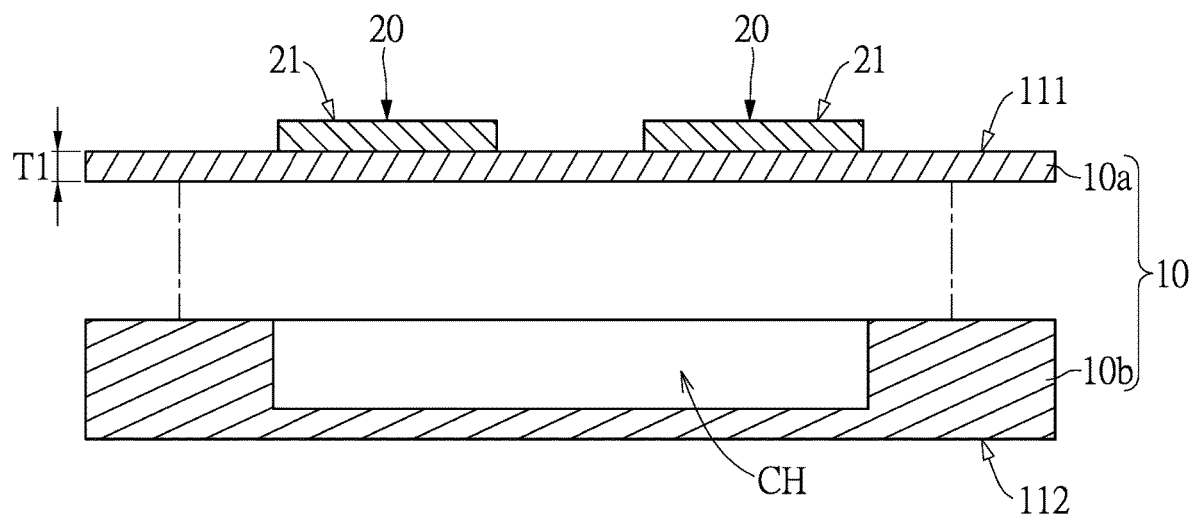
FIG. 4 is an enlarged exploded view of a large-size liquid-cooling cooler according to a second embodiment of the present disclosure.

Referring to FIG. 4, a second embodiment of the present disclosure is substantially the same as the first embodiment, and differences therebetween are described as follows.

In this embodiment, the liquid-cooling cooler body 10 has a first surface 111 and a second surface 112 that are opposite to each other, and the liquid-cooling cooler body 10 includes a first cooler member 10a and a second cooler member 10b. An outer surface of the first cooler member 10a can be the first surface 111, and an outer surface of the second cooler member 10b can be the second surface 112. Furthermore, the first cooler member 10a can be a plate, and a plate thickness T1 of the first cooler member 10a is preferably from 0.5 mm to 3 mm. Moreover, at least one cavity CH can be formed between the first cooler member 10a and the second cooler member 10b, and the at least one cavity CH is the cooling flow channel.

Beneficial Effects of the Embodiments

In conclusion, in the large-size liquid-cooling cooler for an electric vehicle, by the technical features of "the large-size liquid-cooling cooler including a liquid-cooling cooler body and at least one bonding interface layer," "the liquid-cooling cooler body having a projection area greater than 150 cm$^2$, and a cooling flow channel being formed inside the liquid-cooling cooler body for allowing cooling fluid to flow through the cooling flow channel," "the at least one bonding interface layer being a cold spray coating layer formed on the liquid-cooling cooler body by cold spraying and corresponding in position to the cooling flow channel," and "a projection area of the at least one bonding interface layer being greater than 30 cm$^2$, a thickness of the at least one bonding interface layer being between 0.03 mm and 0.25 mm, and a ten-point average roughness (Rz) of a surface of the at least one bonding interface layer being from 30 μm to 90 μm," the liquid-cooling cooler body that is large-sized can be well bonded to at least one electric vehicle power module via at least one bonding interface layer, thereby facilitating mass production and reducing production costs. Furthermore, the liquid-cooling cooler body has a large size for providing sufficient heat dissipation area for the electric vehicle power module, and heat generated by the electric vehicle power module can be rapidly removed through the cooling flow channel of the large-sized liquid-cooling cooler body. Therefore, thermal damage can be avoided, and product stability during use and a service life of the product can be greatly increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A liquid-cooling cooler for an electric vehicle, configured to be bonded to at least one electric vehicle power module, comprising:
    a liquid-cooling cooler body having a top surface area greater than 150 cm², wherein a cooling flow channel is formed inside the liquid-cooling cooler body for allowing cooling fluid to flow through the cooling flow channel; and
    at least one bonding interface layer being a cold spray coating layer formed on the liquid-cooling cooler body by cold spraying and corresponding in position to the cooling flow channel; wherein a top surface area of the at least one bonding interface layer is greater than 30 cm², a thickness of the at least one bonding interface layer is between 0.03 mm and 0.25 mm, and a ten-point average roughness (Rz) of a surface of the at least one bonding interface layer is from 30 μm to 90 μm.

2. The liquid-cooling cooler according to claim 1, wherein the liquid-cooling cooler body has a first surface and a second surface that are opposite to each other, and the liquid-cooling cooler body includes a first cooler member and a second cooler member; wherein an outer surface of the first cooler member is the first surface, and an outer surface of the second cooler member is the second surface; wherein at least one cavity is formed between the first cooler member and the second cooler member, and the at least one cavity is the cooling flow channel.

3. The liquid-cooling cooler according to claim 2, wherein the first cooler member is a plate, and a plate thickness of the first cooler member is from 0.5 mm to 3 mm.

4. The liquid-cooling cooler according to claim 1, wherein the liquid-cooling cooler body is made of aluminum or aluminum alloy.

5. The liquid-cooling cooler according to claim 1, wherein the cooling flow channel has a bent shape.

6. The liquid-cooling cooler according to claim 1, wherein a flow channel height of the cooling flow channel corresponding in position to the at least one bonding interface layer is from 2 mm to 8 mm.

7. The liquid-cooling cooler according to claim 6, wherein a body thickness of the liquid-cooling cooler body is 1.2 times to 4 times the flow channel height of the cooling flow channel corresponding in position to the at least one bonding interface layer.

8. The liquid-cooling cooler according to claim 1, wherein plurality ones of the bonding interface layers correspond in position to the cooling flow channel, the bonding interface layers are arranged in pairs, and one of the pairs of bonding interface layers correspond in position to another one of the pairs of bonding interface layers.

* * * * *